United States Patent [19]

Waibel et al.

[11] Patent Number: 4,907,882
[45] Date of Patent: Mar. 13, 1990

[54] SURVEYING INSTRUMENT FOR AUTOMATICALLY TAKING MEASUREMENTS

[75] Inventors: Reinhard Waibel, Berneck; Werner Dieckow, Heerbrugg, both of Switzerland

[73] Assignee: Wild Heerbrugg AG, Heerbrugg, Switzerland

[21] Appl. No.: 159,860

[22] Filed: Feb. 24, 1988

[30] Foreign Application Priority Data

Mar. 2, 1987 [CH] Switzerland ............. 788/87

[51] Int. Cl.[4] ............................. G02B 23/00
[52] U.S. Cl. ..................... 356/251; 356/248; 33/292; 33/297
[58] Field of Search ............ 356/247, 248, 251, 252; 33/290, 292, 298, 297

[56] References Cited

U.S. PATENT DOCUMENTS

| | | | |
|---|---|---|---|
| 3,227,035 | 1/1966 | Maillard | 356/247 |
| 3,671,100 | 6/1972 | Bushman et al. | 356/251 |
| 4,199,220 | 4/1980 | Casagrande | 356/251 |

Primary Examiner—Vincent P. McGraw
Assistant Examiner—S. A. Turner
Attorney, Agent, or Firm—Wegner & Bretschneider

[57] ABSTRACT

The surveying instrument contains a component part (1) for the optical imaging of a target and a camera (2) for the electronic acquisition of the image produced in the optical instrument part. A reference mark (20) is located in the optical part (1) of the instrument, and this is outside that region of this instrument part through which the optical axis passes. The image of the target is projected into the region located within the reference mark. Connected to the camera is a circuit arrangement which can detect both the effective center of the image of the reference mark and the effective center of the image of the target and which can determine not only the length, but also the direction of the distance between the two effective centers. The surveying of an object or a region can be carried out automatically by means of this instrument.

20 Claims, 2 Drawing Sheets

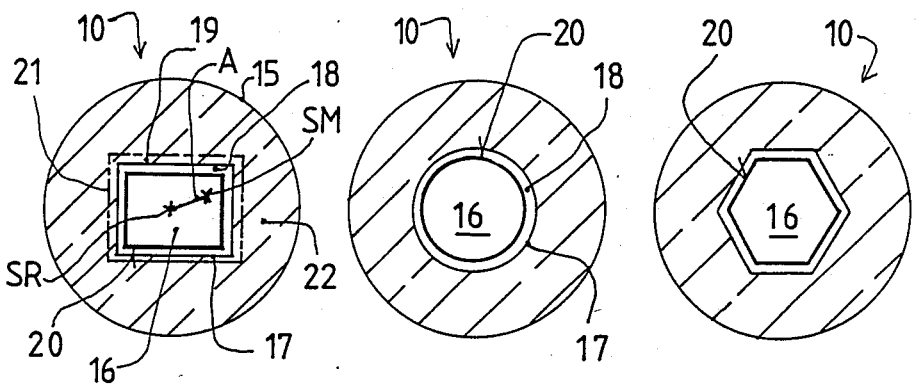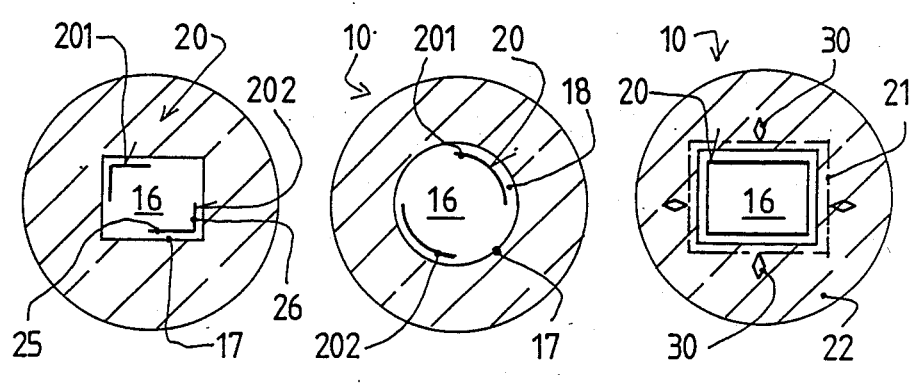

SURVEYING INSTRUMENT FOR AUTOMATICALLY TAKING MEASUREMENTS

The present invention relates to a surveying instrument with a component part for the optical imaging of a target and with a camera for the electronic acquisition of the image produced in the optical instrument part.

Surveying instruments of this type are already known. A sighting telescope serves as the optical component part of such an instrument. Cross hairs are arranged in the sighting telescope. A camera is assigned to the telescope, and the image of the cross hairs and of the target, target figure or target mark which is acquired by this is displayed on a screen. By means of operating elements, the sighting telescope can be adjusted in such a way that the middle part of the image of the target and the middle part of the cross hairs overlap.

In such an instrument, the measured values can be obtained only when the operator adjusts its optical part. However, in many particular uses of surveying instruments, it is necessary for the measured values to be acquired automatically.

The object of the present invention is to provide a surveying instrument which makes it possible to carry out measurements automatically.

According to the invention, in a surveying instrument of the type mentioned in the introduction, this object is achieved in the way defined in the characterizing clause of claim 1.

Exemplary embodiments of the present invention are explained in detail below with reference to the accompanying drawings. In these:

FIG. 2 shows a front view of a diaphragm located in the present instrument,

FIGS. 3 to 6 show further designs of the diaphragm according to FIG. 2, and

FIG. 7 shows a diaphragm which is provided with adjustingmarks.

Figure 1:
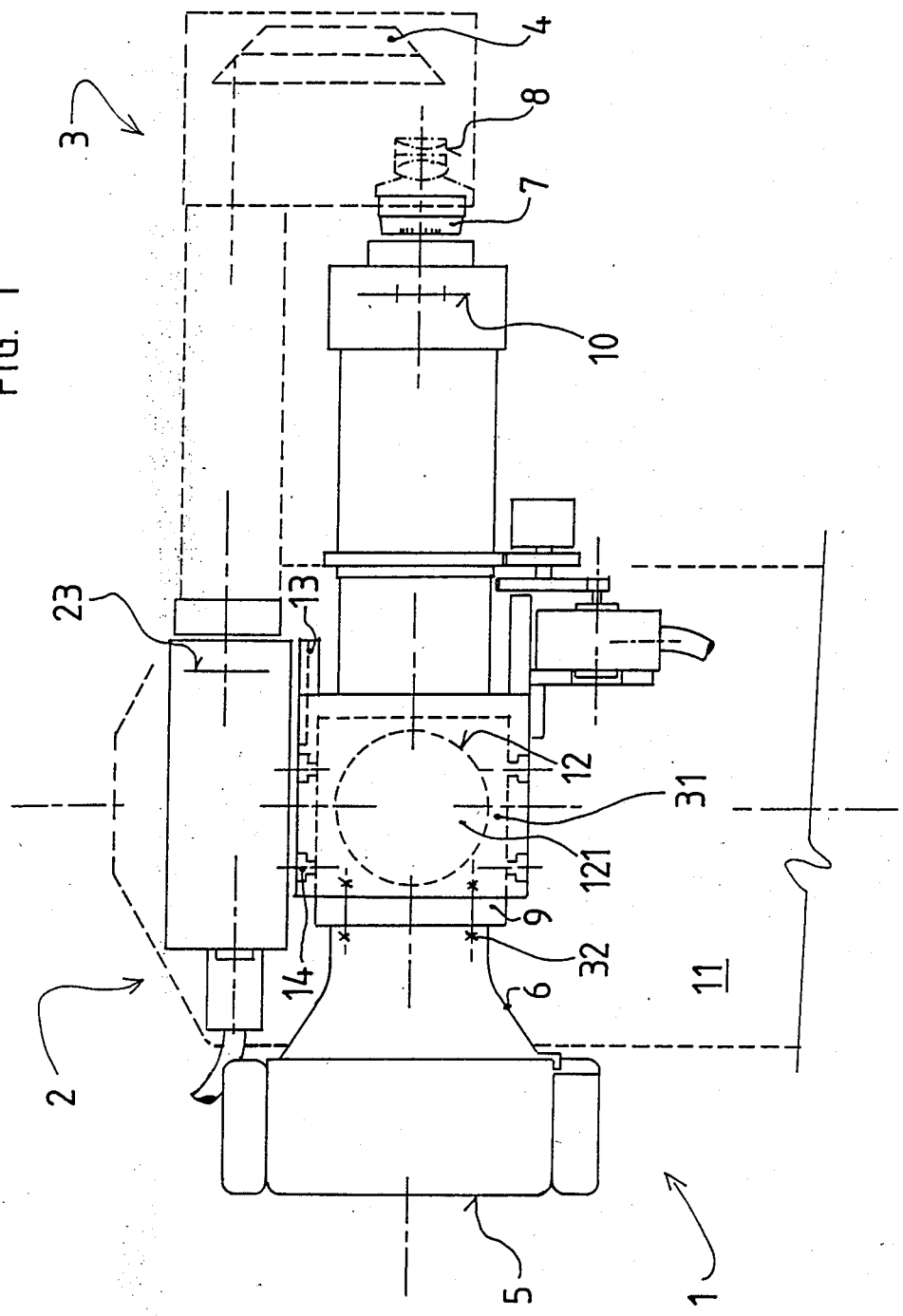
FIG. 1 shows a side view of the present instrument.

The present surveying instrument has an optical component part 1 and a camera 2. The optical instrument part 1 serves for the imaging of a target or a target mark (not shown) which are located in the target space, for example on a piece of land to be surveyed, inside a building or the like, and which mark the particular spot of the object to be surveyed. A measuring mark known per se can be used, for example, as such a mark.

The camera 2 has an optical entry part 23, in which a field composed of optoelectrical elements is located. These serve for converting optical images into electrical signals. Such cameras are likewise already known. The coupling between the exit part of the optical instrument part 1 and the optical entry part 23 of the camera 2 is made by means of an optical deflecting device 3 which is inserted between these two instrument parts 1 and 2. This deflecting device 3 contains, in addition to further parts, such as, for example, imaging optics 8, a prism 4 which effects the necessary deflection of the optical beams to the camera 2.

The optical part 1 has an objective 5 which is located in the initial part of a housing 6. The opposite end part of this housing 6 contains an eyepiece 7, to which the deflecting device 3 is assigned. In the plane in which the real image of the target produced by the objective 5 is obtained, there is a diaphragm 10 which carries a reference mark (20, FIG. 2 and the following Figures). Both the image of the target and the reference mark are therefore visible simultaneously in this plane. The eyepiece 7 is arranged in relation to this plane in such a way that this plane is in the front focal plane of the eyepiece 7. Thus, the image of the target and the image of the reference mark can be observed simultaneously through the eyepiece 7.

FIG. 1 shows one of the supporting sides 11 of the carrier for the telescope 1. The tilting axis 12 comprises two shaft halves 121, of which only the shaft half 121 mounted in the rear supporting side 11 is indicated in FIG. 1. The ends of the shaft halves 121 facing away from the bearing points are fastened to the side faces of a sleeve 31 which thus forms, with these shaft halves 121, a unit rotatable about the tilting axle. The camera 2 is located on a supporting plate 13 which is fastened to the top side of the sleeve 31 by means of screws 14.

The inside diameter of the said sleeve 31 is greater than the outside diameter of the middle part of the telescope housing 6. This middle part of the housing 6, which is cylindrical, is equipped with a holding plate 9 perpendicular to the longitudinal axis of the housing 6. Bores, through which fastening screws 32 for the telescope 1 pass, are made in the corners of this holding plate 9. These screws 32 are screwed into threaded bores which are made in the front side of the sleeve 31. Any mechanical stress exerted on the housing 6 of the telescope 1 by the camera 2 can be prevented as a result of the described fastening of the camera 2 on the sleeve 31, although the total length of the present instrument is the same as the length of a conventional surveying instrument.

It is also possible to omit the eyepiece and assign the entry part of the deflecting device 3 directly to the diaphragm 10.

FIGS. 2 to 7 show several designs of the diaphragm 10. The outer edge 15 of the diaphragm 10 is virtually circular, because the diaphragm 10 has to be arranged in the housing 6. However, the edge 15 can also be considered as the outer limit of the image field of the telescope 1. An aperture 16, having an edge 17, is made in the middle region of the diaphragm 10. The sighting line of the telescope 1 passes approximately through the center of this diaphragm aperture 16. The reference mark 20 already mentioned is located in the diaphragm aperture 16.

In the example shown in FIG. 2, the reference mark 20 has the form of a quadrangular frame located within the diaphragm aperture 16. This means that the outer edge of the reference mark 20 is located at a distance from the inner edge 17 of the diaphragm aperture 16. The portion 18 of the diaphragm 10 located between the outer edge of the reference mark 20 and the edge 17 of the diaphragm aperture 16 has the same transmitting capacity for the incident radiation as the region of the diaphragm 10 located within the reference mark 20. The reference mark 20 is designed so that the radiation striking the diaphragm 10 is prevented at least partially from passing through the diaphragm 10.

The camera 2 covers the middle region of the diaphragm 10. By means of measures known per se, it is possible to ensure that the region of the diaphragm 10, covered by the camera 2 is larger than the area of the diaphragm aperture 16. This means that the camera 2 can cover not only the area of the diaphragm aperture 16, but also that region 19 of the part 22 of the diaphragm 10 opaque to radiation which is directly adjacent to the diaphragm aperture 16. Thus, the dimensions of the camera image field are widened not only in the horizontal direction but also in the vertical direction. The outer limit of the image field of the camera 2 is designated by 21.

FIG. 3 shows a diaphragm 10, in which the edge 17 of the diaphragm aperture 16 is circular and in which the reference mark 20 has the form of a ring, located at a distance 18 from the edge 17 of the diaphragm aperture 16. In the example illustrated, this distance 18 is the same in any direction from the diaphragm 10. FIG. 4 shows a further embodiment of the reference mark 20, in which the diaphragm aperture 16 and the reference mark 20 are hexagonal.

It can be appropriate, under certain circumstances, to make the width of the transmitting region 18 between the reference mark 20 and the diaphragm edge 17 variable or unequal along the reference mark 20. This can even be to the extent that the reference mark 20 takes the form of an offshoot from the diaphragm edge 17.

According to FIGS. 5 and 6, the reference mark 20 can take the form of one or more, in the present case of two cutouts 201 and 202 made in a closed figure. For the reference mark 20 according to FIG. 5, the closed figure is quadrangular. For reference mark 20 according to FIG. 6, it is a circle. The respective portion 201 and 202 of the reference mark 20 according to FIG. 5 is approximately L-shaped, and the legs 25 and 26 of the respective L-shaped portion 201 and 202 of the reference mark 20 can be of the same or of different lengths. In the example shown, the legs 25 and 26 are of different lengths, the longer legs 25 extending horizontally. The portions 201 and 202 of the reference mark 20 are arranged in mutually opposite corners of the quadrangular diaphragm aperture 16, and the width of the transmission region 18 of the diaphragm 10 between the portions 201 and 202 of the reference mark 20 and the edge 17 of the diaphragm aperture 16 is the same and also invariable in both marked portions 201 and 202.

In the diaphragm 10 according to FIG. 6, the reference mark 20 comprises two arcuate portions 201 and 202 which are arranged diametrically opposite one another in a circular diaphragm aperture 16. Here too, the distance 18 between the mark portions 201 and 202 and the edge 17 of the diaphragm aperture 16 is the same and constant.

FIG. 7 shows a diaphragm 10 which closely resembles the diaphragm according to FIG. 2. In contrast to the last-mentioned diaphragm, the diaphragm 10 according to FIG. 7 has adjusting marks 30. These adjusting marks 30 serve for adjusting the diaphragm 10 within the telescope 1, as is generally known. As these adjusting marks 30 do not contribute directly to obtaining measurement results, they are located outside the outer limit 21 of the viewing field of the camera 2 in the region 22 of the diaphragm 10 which is otherwise opaque to light beams. In the exemplary embodiment illustrated, the adjusting marks 30 are diamond-shaped. Such an adjusting mark 30 is arranged symmetrically to each side of the frame 20, the longer diagonal of the diamond 30 being perpendicular to the respective side of the quadrangular reference mark 20.

In the optical entry part of the camera 2, which is coupled to the telescope 1 via the deflecting device 4, there is a field of elements which are sensitive to this radiation, for example light, striking them. These sensors convert the radiation into electrical signals. The sensitive elements are so arranged within the said field that they form rows and columns.

The shape and the size of the sensor field is indicated by the outer limit 21 of the viewing field of the camera 2. It is unimportant for the operation of the present instrument whether the area of the sensor field is actually as large as is indicated by the limiting line 21, or whether the limitation 21 of the sensor field is obtained from a projection of this field in the plane of the diaphragm 10, for example by means of the deflecting device 4. Thus, a specific elementary region of the surface of the diaphram 10, limited by the limiting line 21 of the image field of the camera 2, is assigned to the respective radiation-sensitive element of the sensor field 21. The image field of the camera 2 therefore also includes the edge part 19 of the diaphragm 10. Conversely, it can be said that the state of irradiation of the respective elementary region of the diaphragm 10 has an effect on the corresponding sensor element of the camera 2 according to the manner of assignment mentioned. By means of suitable electronic circuits, the charged state of the sensors can be determined and the signal obtained thereby can be further transmitted to further circuits for processing. Such cameras 2 belong to the state of the art.

When radiation travels from an elementary region of the diaphragm 10 to the corresponding sensitive element of the camera 2, an electrical signal appears at the output of this element. If there is no irradiation, the particular sensor element emits no electrical signal. On the basis of this knowledge known per se, it can be said that sensitive elements located behind the elementary regions of the diaphragm 10 which are opaque to the radiation used, for example behind the reference mark 20 or its component parts 201 and 202 and behind the edge region 19 of the diaphragm aperture 16, emit no electrical signal. The opposite is of course true for the irradiated sensor elements. Although the charged state of the sensor elements in the said field is interrogated sequentially by the said electronic circuits, there are nevertheless known processes and circuits which make it possible to convert the sequential signal so that an electrical image corresponding to the optical image is obtained on the diaphragm 10.

Thus, the path of the edge 17 in the diaphragm aperture 16 and/or the form of the reference mark 20 can be detected electrically, specifically as a contrast to the unmasked elementary areas of the diaphragm 10. A first of these areas is located in the region of the diaphragm aperture 16 limited by the reference mark 20, whilst a second such area 18 is between the outer edge of the reference mark 20 and the edge 17 of the diaphragm aperture 16.

The optical part 1 of the present instrument can initially be aligned in such a way that the image of the desired or sought target figure falls into that region of the diaphragm aperture 16 which is located within the reference mark 20. The image of the target figure, like the reference mark 20, etc., is characterized by contrasts between light and dark which are next to one another. The sensor in the camera 2 assigned to the respective elementary area of the diaphragm aperture 16 therefore supplies an electrical signal or not, depending on whether it is in a light or dark region of the image of the target figure. In this way, not only the shape of the image of the target figure, but also its position within the diaphragm aperture 16 can be detected electrically. The circuits connected to the camera 2 can consequently also supply the basic information as to whether the image of a target figure or of a specific target figures is in the diaphragm aperture 16 or not.

After it is found that the image of the desired target is located in the diaphragm aperture 16, the coordinates of this target can be read off approximately, for example by means of the corresponding graduated circles of the surveying instrument. So that the exact position of the target can be given, however, it is also necessary to determine the distance between the sighting line of the optical instrument part and the image of the target mark.

A form which can easily be described or acquired mathematically is advantageously chosen for the reference mark 20. The reference mark 20 can have the form of a quadrangle, a polygon, a circle or at least a cut-out from these or parts of them. There are already known circuits which can calculate the effective center of the particular curve from the electrical signals reproducing such curves. Such a circuit can be a component part of the circuit arrangement connected to the output of the camera 2. The effective center SR of the reference mark 20 calculated in this way forms one of the points of the sighting line of the telescope 1.

The said circuit can also calculate the effective center SM of the image of the target in the same way. There are thus two effective centers SR and SM which are at a distance from one another in most cases. The distance A connecting these two points SR and SM has a specific length and a specific direction. The electrical circuit arrangement connected to the camera 2 is also designed so that it is capable of determining the length and direction of the said distance A between the two effective centers SR and SM. By means of the particulars relating to this distance A, the approximate readings already mentioned, taken from the graduated circles of the instrument, are corrected so that exact particulars relating to the position of the target can be obtained.

It goes without saying that the reference mark can also take a different form. For example, simply the edge 17 or the edge region 19 of the diaphragm aperture 16 can serve as a reference mark, so that there is no need for a special reference mark in the diaphragm aperture. On the other hand, a mark 20 or 201, 202 or the like of the shape described can be arranged in the image field of the optical instrument part, without being surrounded by a diaphragm. The present invention relates to all possible embodiments, coming within the scope of the present patent cover, of the subject disclosed in these documents. It must also be pointed out that all the features disclosed in the present documents are to be considered as essential to the invention.

We claim:

1. A surveying instrument with an optical component part having an exit section, said surveying instrument for imaging of a target comprising:
    an objective assembly,
    a camera optically coupled to said exit section of the optical component part,
    an electronic circuit arrangement electrically coupled to the output of said camera,
    a carrier, said carrier being placed within said optical component part in a plane in which the rear image of the target produced by the object assembly is obtained, and
    a reference mark formed on said carrier and having at least one non-straight line and not intersecting the optical axis of said optical component.

2. An instrument as claimed in claim 1, wherein said carrier comprises a material pervious to radiation passing through said objective assembly, said carrier having an outer edge forming the outer limitation of the image field of said optical component part and said reference mark thereon comprises a material opaque to said radiation.

3. An instrument as claimed in claim 2, wherein said carrier is designed as a diaphragm having an aperture in its center region surrounding the optical axis of said optical component part such that the sighting line of the optical component part passes approximately through the center of said aperture and an opaque region of said diaphragm surrounding said aperture has an inner edge forming a boundary between said opaque region and said aperture.

4. An instrument as claimed in claim 3, wherein the outer edge of said reference mark is spaced at a distance from said inner edge of said aperture.

5. An instrument as claimed in claim 4, wherein said inner edge of said aperture is quadrangular and said reference mark has the form of a quadrangular frame spaced at a distance from said edge of said aperture.

6. An instrument as claimed in claim 4, wherein said edge of said aperture is circular and said reference mark has the form of a ring spaced at a distance from said edge of said aperture.

7. An instrument as claimed in claim 4, wherein said reference mark takes the form of one or more cutouts in a closed figure formed by said aperture.

8. An instrument as claimed in claim 7, wherein said closed figure is quadrangular, and said reference mark of portions thereof are approximately L-shaped, such that the legs of said L-shaped portion are of equal or unequal length and said portions are arranged in mutually opposite corners of said quadrangular closed figure formed by said aperture.

9. An instrument as claimed in claim 7, wherein said closed figure is a circle, such that the said reference mark or portions thereof are arcuate, and said mark or portions thereof are arranged diametrically opposite one another in said circular closed figure formed by said aperture.

10. An instrument as claimed in claim 2, wherein said reference mark is spaced at a distance from said outer edge of said carrier.

11. An instrument as claimed in claim 3, wherein reference mark is defined as the inner edge of the opaque region of said diaphragm.

12. An instrument as claimed in claim 3, wherein said carrier has adjusting marks located outside the viewing field of said camera in said opaque region of said carrier, said region being opaque for incident radiation.

13. An instrument as claimed in claim 1, wherein said reference mark has the form of an angular or circular frame or part thereof located within said aperture such that the outer edge of said reference mark is spaced at a distance from said inner edge of said aperture.

14. An instrument as claimed in claim 1, wherein said optical component part is a telescope and wherein said objective assembly is located in an initial part of the housing of the telescope whereby said housing is supported on a tilting axle, said camera being fastened to the outer side of said housing and said camera is assigned to the telescope such that said camera can acquire both the image of a target and the image of said reference mark.

15. An instrument as claimed in claim 14, wherein a deflecting device is inserted between said optical component part and said camera such that said deflecting device couples the exit section of said optical component part with an optical entry section of said camera.

16. An instrument as claimed in claim 15, wherein said entry section of said deflecting device is assigned directly to said carrier of said reference mark.

17. An instrument as claimed in claim 15, further comprising an eyepiece located in the exit section of the optical component part such that an entry section of said deflecting device is assigned to an exit section of said eyepiece.

18. An instrument as claimed in claim 17, wherein said eyepiece is arranged in relation to said carrier of said reference mark such that said carrier is located in the front focal plane of said eyepiece.

19. An instrument as claimed in claim 1, wherein said camera further comprises an entry section, said entry section having a field of sensitive elements which convert incident radiation into electrical signals, said field of sensitive elements having a shape and size such that said sensitive elements are coupled to the middle region of said carrier, such that the region of the carrier covered by said camera is larger than the area of said reference mark, said region of the carrier also covers an edge region lying outside said reference mark.

20. An instrument as claimed in claim 1, wherein the electronic circuit arrangement is designed such that it can detect the effective center of the image of said reference mark and the location of the image of a target lying within the image of said reference mark.

* * * * *